United States Patent
Nam et al.

(10) Patent No.: US 7,429,412 B2
(45) Date of Patent: Sep. 30, 2008

(54) LIQUID CRYSTAL DISPLAY DEVICE AND METHOD FOR MANUFACTURING THE SAME

(75) Inventors: Mi Sook Nam, Goonpo-si (KR); Su Hyun Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 528 days.

(21) Appl. No.: 09/968,652

(22) Filed: Oct. 3, 2001

(65) Prior Publication Data

US 2002/0039160 A1 Apr. 4, 2002

(30) Foreign Application Priority Data

Oct. 4, 2000 (KR) .............................. 2000-58149

(51) Int. Cl.
*G02F 1/139* (2006.01)
*G02F 1/1337* (2006.01)

(52) U.S. Cl. ................... 428/1.2; 428/1.23; 349/124; 349/131; 349/135; 430/321

(58) Field of Classification Search ............... 428/1.2, 428/1.23–1.28; 349/123–124, 128, 135, 349/138, 131; 430/320–321
See application file for complete search history.

(56) References Cited

U.S. PATENT DOCUMENTS

| | | | | | |
|---|---|---|---|---|---|
| 3,650,885 | A | * | 3/1972 | Nass et al. | 430/281.1 |
| 4,229,520 | A | * | 10/1980 | Bratt et al. | 430/322 |
| 4,242,437 | A | * | 12/1980 | Rohloff | 430/270.1 |
| 4,354,740 | A | * | 10/1982 | Cole, Jr. | 349/130 |
| 4,469,409 | A | * | 9/1984 | Nakano et al. | 428/1.23 |
| 4,974,941 | A | | 12/1990 | Gibbons et al. | 350/349 |
| 5,032,009 | A | | 7/1991 | Gibbons et al. | 350/341 |
| 5,114,832 | A | * | 5/1992 | Zertani et al. | 430/285.1 |
| 5,258,225 | A | * | 11/1993 | Katsamberis | 428/331 |
| 5,387,445 | A | * | 2/1995 | Horiuchi et al. | 428/1.54 |
| 5,389,698 | A | | 2/1995 | Chigrinov et al. | 522/2 |
| 5,464,669 | A | | 11/1995 | Kang et al. | 428/1 |
| 5,528,401 | A | * | 6/1996 | Narutaki et al. | 349/124 |
| 5,538,823 | A | | 7/1996 | Park et al. | 430/20 |
| 5,623,354 | A | * | 4/1997 | Lien et al. | 349/124 |
| 5,627,227 | A | * | 5/1997 | Suga et al. | 524/91 |
| 5,629,358 | A | * | 5/1997 | Nagahata et al. | 522/84 |

(Continued)

FOREIGN PATENT DOCUMENTS

EP 0 525 473 B1 2/1993

(Continued)

OTHER PUBLICATIONS

Derwent Abstract 1986-295129 JP 61217020A, Sharp KK, 1986.*

(Continued)

*Primary Examiner*—Keith D. Hendricks
*Assistant Examiner*—Sophie Hon
(74) *Attorney, Agent, or Firm*—Morgan, Lewis & Bockius LLP

(57) ABSTRACT

A liquid crystal display device includes a first substrate; a second substrate; a first alignment layer on the first substrate, the first alignment layer including a first additive; a second alignment layer on the second substrate; and a liquid crystal layer between the first substrate and the second substrate.

4 Claims, 4 Drawing Sheets

U.S. PATENT DOCUMENTS

| | | | |
|---|---|---|---|
| 5,641,426 A * | 6/1997 | Nerad et al. | 252/299.01 |
| 5,656,340 A | 8/1997 | Ubukata et al. | 428/1 |
| 5,663,212 A * | 9/1997 | Wakata et al. | 522/75 |
| 5,705,096 A | 1/1998 | Kano et al. | 252/299.4 |
| 5,767,994 A | 6/1998 | Kang et al. | 359/72 |
| 5,789,524 A * | 8/1998 | Hsu et al. | 528/170 |
| 5,824,377 A | 10/1998 | Pirwitz et al. | 428/1 |
| 5,850,498 A * | 12/1998 | Shacklette et al. | 385/129 |
| 5,889,571 A * | 3/1999 | Kim et al. | 349/124 |
| 5,928,561 A | 7/1999 | Bryan-Brown et al. | 252/299.4 |
| 6,001,517 A * | 12/1999 | Kawamonzen | 430/18 |
| 6,251,963 B1 * | 6/2001 | Kohler et al. | 522/64 |
| 6,256,082 B1 * | 7/2001 | Suzuki et al. | 349/144 |
| 6,277,986 B1 * | 8/2001 | Hall-Goulle et al. | 544/279 |
| 6,352,758 B1 * | 3/2002 | Huang et al. | 428/143 |
| 6,419,873 B1 * | 7/2002 | Buazza et al. | 264/496 |
| 6,504,591 B1 * | 1/2003 | Kondo et al. | 349/123 |
| 6,577,356 B2 * | 6/2003 | Onishi et al. | 349/32 |
| 6,610,462 B1 * | 8/2003 | Chien et al. | 430/321 |
| 6,649,230 B1 * | 11/2003 | Seiberle et al. | 428/1.2 |
| 6,831,148 B2 * | 12/2004 | Buchecker et al. | 528/310 |

FOREIGN PATENT DOCUMENTS

| | | |
|---|---|---|
| EP | 0 525 478 B1 | 2/1993 |
| EP | 0 611 786 B1 | 8/1994 |
| EP | 0 705 384 B1 | 4/1996 |
| EP | 0 742 471 A2 | 11/1996 |
| EP | 0 750 212 A2 | 12/1996 |
| JP | 09-265095 | 10/1997 |
| KR | 1999-0065671 | 8/1999 |
| KR | 2000-0031955 | 5/2000 |

OTHER PUBLICATIONS

Patent Abstracts of Japan, Publication No. 57-108828, Jul. 7, 1982.*
JPO Website Machine English Translation of JP07281192A, Yokokura et al., Oct. 1995.*
"Surface-Induced Parallel Alignment of Liquid Crystals by Linearly Polymerized Photopolymers", Japanese Journal of Applied Physics, pp. 2155-2164, vol. 31, No. 7, Jul. 1992.

* cited by examiner

LIQUID CRYSTAL DISPLAY DEVICE AND METHOD FOR MANUFACTURING THE SAME

The present invention claims the benefit of Korean Patent Application No. 2000-58149 filed in Korea on Oct. 4, 2000, which is hereby incorporated by reference.

BACKGROUND OF THE INVENTION

1. Field of the Invention

The present invention relates to a liquid crystal display device (LCD), and more particularly to a liquid crystal display device in which an additive is added to a photo-alignment material for forming a photo-alignment film of an LCD so that photo-stability can be enhanced and image sticking can be improved.

2. Discussion of the Related Art

Referring to FIG. 1, for example, an LCD generally includes transparent substrates 11 and 12 that are opposed to each other by a spacer (not shown) for maintaining a cell gap with a distance that allows injection of a liquid crystal 13 which is sealed by a sealant 14.

The transparent substrate 11 is provided with a plurality of pixel electrodes 15 covered with an alignment film at the inner surface. Each of the pixel electrodes 15 is provided with a thin film transistor (TFT) 16 which functions as a switching device. Here, a drain electrode of a TFT 16 is connected with each pixel electrode 15.

Meanwhile, the other transparent substrate 12 is provided at the inner surface with a transparent common electrode 17 opposed to the plurality of pixel electrodes 15 and covered with another alignment film.

FIG. 2 shows the above-described LCD together with a driving circuit thereof.

The LCD comprises a liquid crystal panel 20, a scanning line driving circuit 21 for driving the liquid crystal panel 20 and a signal line driving circuit 22.

A plurality of scanning lines 23 and a plurality of signal lines 24 are placed on a substrate of the liquid crystal panel 20 such that they intersect each other in the pattern of a matrix, and the thin film transistor 16 and the pixel electrode are installed at one of the intersecting portions thereof.

The scanning line driving circuit 21 transmits scanning signals, which transmit ON signals to the gate of the thin film transistor 16 and to the scanning lines 23 in sequence. The signal line driving circuit 22 transmits image signals to the signal lines 24 so that the image signals can be transferred to the pixel through the thin film transistor 16 driven by the scanning signals.

When the scanning line driving circuit 21 transmits the scanning signals in sequence to the scanning lines 23 of the liquid crystal panel 20 so that all of the thin film transistors 16 connected to the scanning lines 23 are powered on or energized, the signals applied to the signal lines 24 of the liquid crystal panel 20 are transferred to the pixels through sources and drains of the thin film transistors 16.

According to the aforementioned operation principle, the pulse is transferred to all gate electrodes in sequence and a signal voltage is applied to a corresponding source electrode so that all the pixels of the liquid crystal panel can be driven. After an image of one frame is displayed in this manner, the next frames are continuously displayed to achieve a dynamic image display.

In such image display, a vast amount of information such as a color display cannot be expressed by driving only white and black pixels. Therefore, a gradation (gray) display is implemented, in which several intermediate states further exist between white and black states. Referring to a black-and-white LCD, when an intermediate voltage is applied, an intermediate state such as a gray color exists to display information.

In order to obtain an intermediate value of voltage, the voltage intensity is adjusted, or the width of voltage pulse is adjusted.

In a color LCD, a color display is determined based on the degree of the gradation display.

A driving IC of 6 bits can produce 64 gradations, and a monitor or audio/video (AV) product that requires a full color spectrum has 16,000,000 colors in 256 gradations.

As in the foregoing description, since an LCD is an apparatus that adjusts the magnitude of the voltage applied to the liquid crystal to display information on a screen, the gradation of an LCD is adjusted based the degree of light transmission varying according to voltage.

The LCD is generally comprised of two substrates oppositely arranged with a predetermined distance from each other and the liquid crystal is injected between the two substrates.

In the case of a TFT color LCD, the first substrate is provided with pixel electrodes, transistors for driving pixels and an alignment film. The second substrate is provided with another alignment film, RGB color filters and a common electrode, and the liquid crystal is injected between the two substrates to complete the construction of the LCD.

However, as is well known in the art, since the liquid crystal has refractive anisotropy about the short and long axes, the LCD requires that the arrangement of liquid crystal molecules be uniformly controlled in order to obtain uniform brightness and high contrast ratio. For this purpose, the substrate surface defining a liquid crystal cell is coated with the alignment film, and an orientation treatment such as rubbing is performed to impart an orientation to the liquid crystal.

An LCD using the photo-alignment film of the related art has several drawbacks. For example, the easy axis is rotated upon exposure to external light to lower luminance, light-leakage takes place and, in particular, the contrast ratio is lowered.

SUMMARY OF THE INVENTION

Accordingly, the present invention is directed to an LCD device that substantially obviates one or more of the problems due to limitations and disadvantages of the related art.

An object of the present invention is to provide an LCD with enhanced photo-stability and reduced image-sticking.

Another object of the present invention is to provide an LCD that produces reliability information such as display characteristics and image-sticking.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the LCD device includes: a first substrate; a second substrate; a first alignment layer on the first substrate, the first alignment layer including a first additive; a second alignment layer on the second substrate; and a liquid crystal layer between the first substrate and the second substrate.

In another aspect, a method of manufacturing the LCD device includes the steps of: forming a photo-alignment layer having an additive on a first substrate; baking the photo-alignment layer; and irradiating the photo-alignment layer by a light.

In yet another aspect, the LCD device includes: a first substrate; a second substrate; a first alignment layer on the first substrate, the first alignment layer including a first additive, a first photo-initiator and a photo-alignment layer; a second alignment layer on the second substrate, the second alignment layer including a second additive and a second photo-initiator; and a liquid crystal layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In general, an LCD is comprised of two substrates that are oppositely arranged with a predetermined distance from each other and a liquid crystal is injected between the substrates. In addition, an alignment film for the orientation of the liquid crystal is provided on the opposing surface of the two substrates.

The product specification of such an LCD may include viewing angle, luminance and color characteristics and product reliability information such as display characteristics and image-sticking information. Viewing angle, luminance and color characteristics may be related to cell design, and display characteristics and image-sticking may be related to the alignment material used.

During the manufacturing of the LCD devices that employ the photo-alignment technology of the present invention, image-sticking is created due to a weak surface anchoring energy of the alignment film, high flexibility (i.e., low packing density) or low surface hardness. Since the image-sticking resulting because of the above reasons is severe and lasts for a long time, a cross linking agent is added to the alignment material to increase the cross linking index flexibility of the alignment film, thereby easing the image-sticking.

The image-sticking in the LCD takes place due to the luminance difference between a portion where an image exists and a portion where the image does not exist. The optical transmittance characteristic of the liquid crystal can be considered to have been changed. This is caused by the effect of impurities (or the effect of DC voltage) when the optical transmission characteristic of the liquid crystal is changed, or by the variation of a pretilt angle (or the effect of AC and DC voltage or generally AC voltage) when the VT curve of the liquid crystal is changed.

Figure 1:
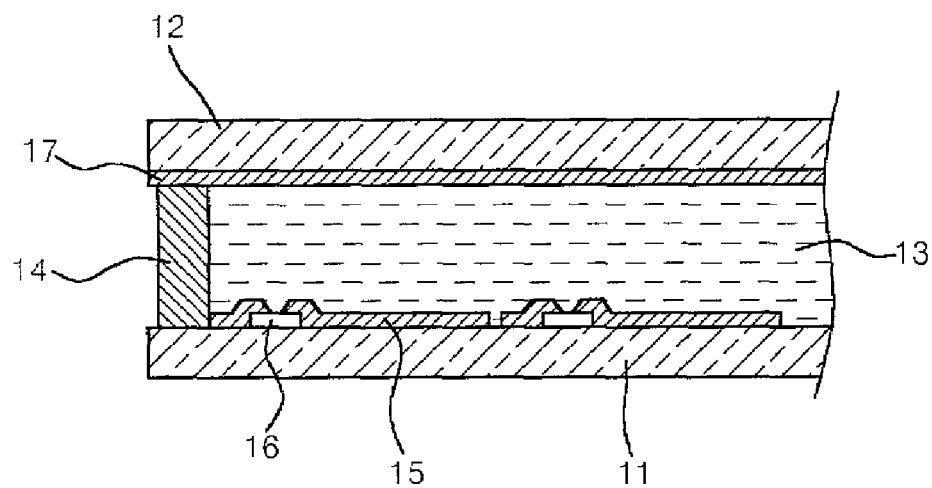
FIG. 1 depicts a schematic plan view showing a structure of a related art LCD.
Figure 2:
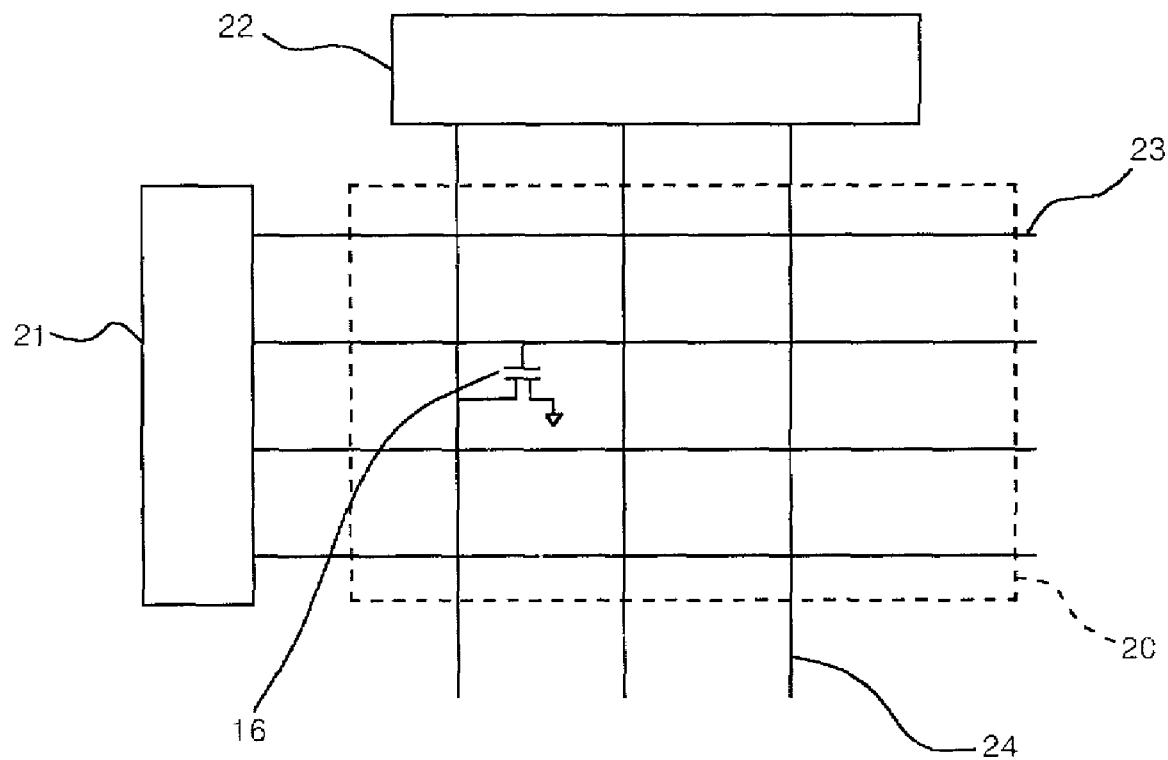
FIG. 2 depicts a schematic plan view showing a driving circuit of a related art LCD.
Figure 3:
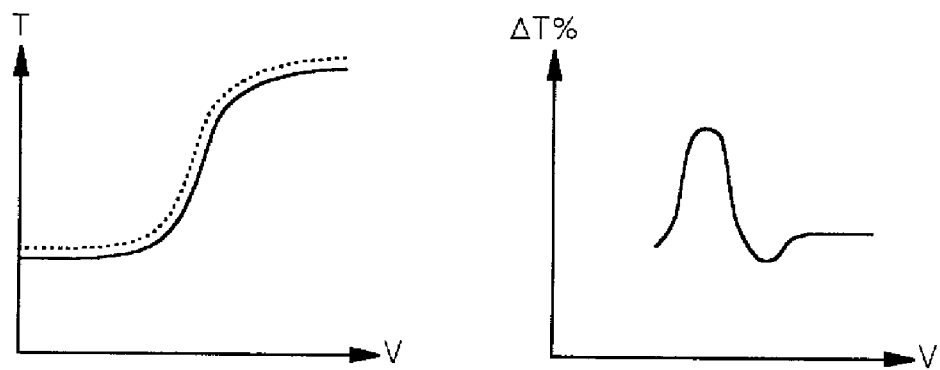
FIG. 3 depicts graphs showing an example of voltage versus transmittance (VT) curve in a related art LCD.

FIG. 3 shows the variation of VT characteristics observed when a predetermined magnitude of voltage and a square wave are applied to a liquid crystal cell for a predetermined time period. The dotted line designates a VT characteristic after applying the voltage and the solid line designates a VT feature before applying the voltage in percentage(%), so as to show that the generation of the image-sticking due to the applied voltage can be displayed.

Here, $T=T1/(T1-T2) \times 100$ (%), where $T1$ represents the transmittance before applying an AC stress, and $T2$ represents the transmittance after applying the AC stress.

The LCD, which is formed by injecting the liquid crystal between a pair of substrates in accordance with the present invention, further comprises an additive added to the photo-alignment film for the orientation of the liquid crystal so as to increase the cross linking index of the photo-alignment material.

The liquid crystal can have either a positive dielectric anisotropy or a negative dielectric anisotropy, and a chiral dopant may also be added.

Moreover, the LCD of the present invention may further include additives, such as benzotriazols, acrylates, UV epoxies and silanes, for increasing the cross linking index of the alignment film.

Figure 4:
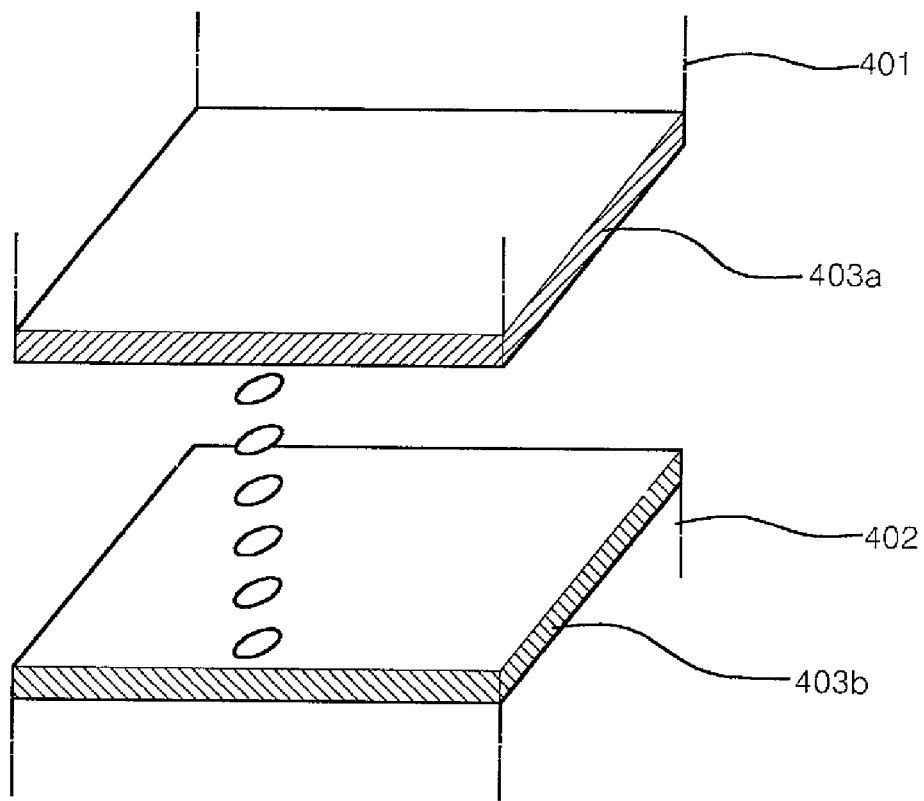
FIG. 4 depicts a schematic plan view showing the structure of an LCD according to the present invention.

FIG. 4 shows an example in which an additive and a photo-initiator are added to photo-alignment films 403a and 403b between upper and lower substrates 401 and 402 in the LCD of the present invention.

Here, the additive added to the photo-alignment films 403a and 403b may be one of the following elements: benzotriazols, silanes, acrylates such as monomer or oligomer, or UV epoxies such as monomer and oligomer.

The additive concentration should be less than 8%, and preferably 1 to 5%, of the solid concentration in the alignment film.

Also, the photo-initiator concentration should not be greater than 4% of the solid concentration in the alignment film.

For example, 5% of the additive and 2% of the photo-initiator may be added to the 5% of the photo-alignment solution. The additive and the photo-initiator are used after stirring for at least 24 hours at room temperature in a dark room. Here, when the photo-initiator is used to increase the cross linking of each cross linking agent, the photo-initiator is adapted to have a concentration of less than or equal to 50% of the solid concentration of the additive.

After the photo-alignment solution, including the additive prepared as described above, is coated on the Indium-tin-oxide (ITO) substrate, the ITO substrate coated with the photo-alignment solution may be irradiated by light, and thereafter undergo the process steps of baking, photo-alignment and cell preparation to complete the LCD. Alternatively, the ITO substrate coated with the photo-alignment solution can also undergo the process steps of baking, photo-alignment and cell preparation to complete the LCD without being irradiated by light.

After the cell is exposed to light, the relative variation of an easy axis about the initial orientation direction is measured to obtain the photo-stability.

Figure 5:
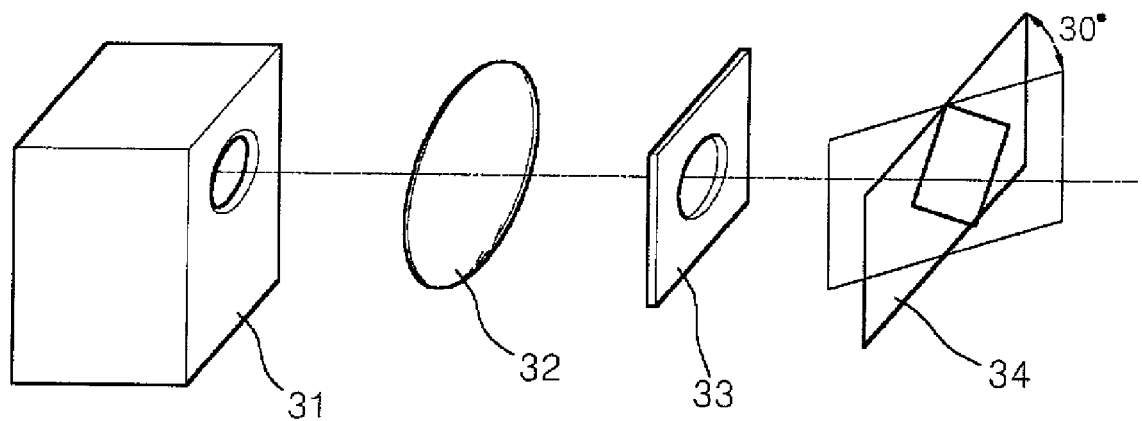
FIG. 5 depicts a schematic plan view showing the structure of an exposure apparatus according to the present invention.

FIG. 5 schematically shows the structure of an exposure apparatus applied to an embodiment of the present invention.

Light from a UV lamp 31 is irradiated to a sample 34 through a lens 32 and a collimator 33. Here, the cell is set to have angles θ and ρ which are 45° and 35°, respectively. After the exposure to the external light, the variation of the easy axis is measured to determine the photo-stability.

Referring to the relative variation of the easy axis measured after exposing the cell to external light 20 mJ as a result of the experiment, for example, when the additive used is one of the acrylates (available with the brand name SR499 from SARTOMER), the variation of the easy axis is 3.15 in the exposure. Here, a comparative sample (a liquid crystal cell having a photo-alignment film structure without additive) shows less stable characteristics when compared to the results shown in FIG. 6.

Consequently, it has been determined that the photo-stability increases when the additive is added to the photo-alignment material.

According to the foregoing description of the invention, it can be observed that the addition of a photo-sensitive material increases the decrement of a UV absorption spectrum.

In this experiment, the alignment film including the additive is spin coated and cured at 200° C. for one hour, and afterwards the UV spectrum measurement is conducted. The alignment film is irradiated by light for 30 seconds followed by the UV spectrum measurement. Furthermore, a heat treatment is performed for three hours at 150° C. and then the UV spectrum is measured to compare photo-reactivities (wherein the intensity of the UV lamp is 7 mW/cm2 in 350 nm).

Figure 6:
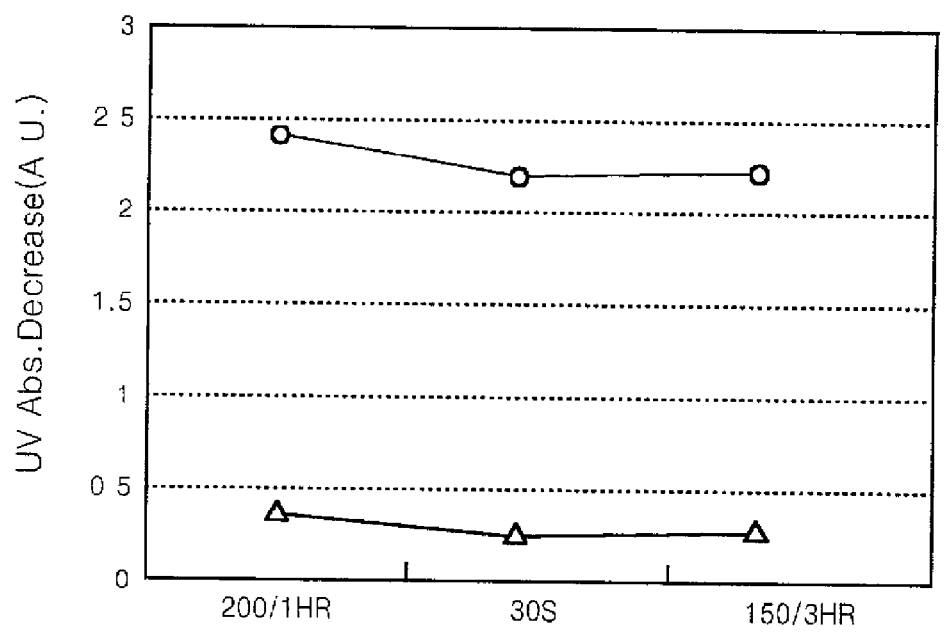
FIG. 6 depicts a graph showing a first example of the present invention.

After the spin coating, a decrease of the UV absorption spectrum is calculated based upon the intensity of the absorption peak of the initial spectrum. FIG. 6 shows results of the experiment. As shown in FIG. 6, the decrease of the UV absorption spectrum is larger when the photo-sensitive material is added (designated by circles) than when the photo-sensitive material is not added (designated by triangles). The additive used in FIG. 6 is acrylates.

As shown in the above results, it is observed that the additive added to the photo-alignment material increases the photo-stability.

Figure 7A:
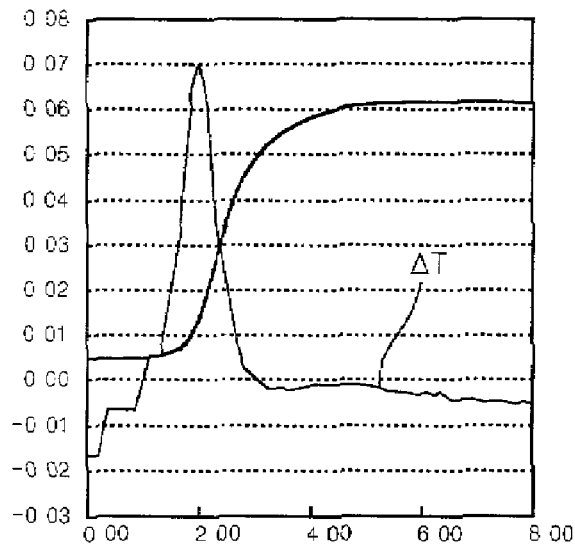
FIG. 7 depicts graphs showing a second example of the present invention.
Figure 7B:
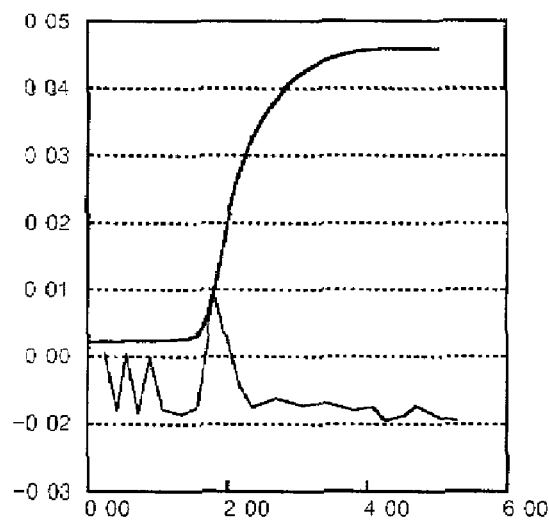
Figure 7C:
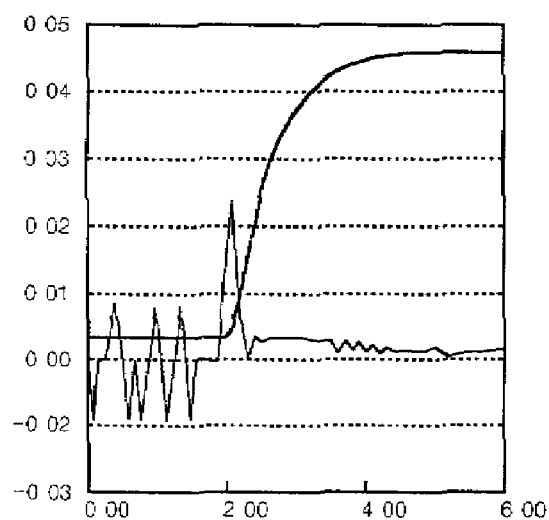

FIG. 7 shows an example of the variation of VT curves before the addition of the additive (FIG. 7A) and after the addition of the additive (FIGS. 7B and 7C), and the residual DC image-sticking thereof. This shows the extent of the variation of the initial VT curves on the ITO test cell after the application of AC voltage or DC and AC voltage, and it is directly related to the image-sticking.

Again, as can be seen in FIG. 7, the reduction of the image-sticking can be observed when the additive is added to the photo-alignment material. The additives used in FIG. 7B are the UV epoxies (HI-5), and the additives used in FIG. 7C are the silanes (Y1-2).

The photo-alignment film of the present invention can also be applied to In-Plane Switching (IPS), Homeotropic Twisted Nematic (HAN), Vertical Alignment (VA) and the like in addition to a general TN mode.

Also, the photo-alignment film containing the additive can be formed on only one substrate while the polyimides as a typical alignment film can be formed on the other substrate for rubbing thereof. In this application, image-sticking can be decreased more effectively. In addition to the polyimides, polyamides, polyamic acids and the like are also available for the alignment film.

Light is irradiated to the photo-alignment film at least one time to permit the determination of the pretilt angle and the orientation direction.

The irradiation of light can be performed in the vertical direction and/or an inclined direction, in which non-polarized light, un-polarized light, linearly polarized light, partially polarized light and the like can be utilized.

According to the present invention, additives such as benzotriazols, acrylates, UV epoxies, silanes and the like are added to the photo-alignment material when forming the alignment film to improve the photo-stability while increasing the cross linking reactivity of the photo-alignment film to decrease the image-sticking.

It will be apparent to those skilled in the art that various modifications and variations can be made in the LCD of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate;
   a first alignment layer on the first substrate;
   a second alignment layer on the second substrate; and
   a liquid crystal layer between the first substrate and the second substrate,
   wherein the first alignment layer includes a photo-alignment layer which is irradiated with light that is non-polarized, linearly polarized, or partially polarized, at least one time in the vertical direction and/or an inclined direction, the photo-alignment layer including a cross linking agent, an additive, and a photo-initiator for reducing an image-sticking in the liquid crystal display device and for inducing photo-stability of the first alignment layer,
   the additive increasing the cross linking index of the photo-alignment later, and is selected from a group consisting of benzotriazols and silanes having a concentration of at least 4% but less than 8% of the solid concentration of the photo-alignment layer, and
   the photo-initiator having a concentration that is greater than 0% but less than or equal to 50% of the solid concentration of the additive, and is not greater than 4% of the solid concentration in the photo-alignment layer, such that ΔT of the liquid crystal display device is less than 0.03 for reducing the image-sticking, wherein ΔT=T1/(T1−T2)×100(%), where T1 represents the transmittance before applying an AC stress to a liquid crystal cell, and T2 represents the transmittance after applying the AC stress to the liquid crystal cell.

2. The device of claim 1, wherein the second alignment layer also includes the photo-alignment layer.

3. The device of claim 1, wherein the second alignment layer includes a rubbed film.

4. The device of claim 3, wherein the rubbed film includes material selected from a group consisting of polyimides, polyamides, and polyamic acids.

* * * * *